(12) United States Patent
Cho et al.

(10) Patent No.: US 8,855,210 B2
(45) Date of Patent: Oct. 7, 2014

(54) METHOD AND APPARATUS FOR ENCODING AND DECODING MULTI-VIEW VIDEO USING IMAGE STITCHING

(75) Inventors: Suk Hee Cho, Daejeon (KR); Kug Jin Yun, Daejeon (KR); Dae Hee Kim, Daejeon (KR); Chung Hyun Ahn, Daejeon (KR); Soo In Lee, Daejeon (KR); Kwang Hoon Sohn, Seoul (KR); Yong Tae Kim, Seoul (KR)

(73) Assignees: Electronics and Telecommunications Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 61 days.

(21) Appl. No.: 13/474,158

(22) Filed: May 17, 2012

(65) Prior Publication Data

US 2012/0224623 A1 Sep. 6, 2012

Related U.S. Application Data

(63) Continuation of application No. 11/576,964, filed as application No. PCT/KR2005/003361 on Oct. 10, 2005, now Pat. No. 8,204,133.

(30) Foreign Application Priority Data

Oct. 12, 2004 (KR) .......... 10-2004-0081240
Apr. 22, 2005 (KR) .......... 10-2005-0033477

(51) Int. Cl.
*H04N 7/12* (2006.01)
*H04N 11/02* (2006.01)
*H04N 13/02* (2006.01)
*H04N 5/225* (2006.01)
*G09G 5/00* (2006.01)
*G06K 9/00* (2006.01)
*H04N 19/597* (2014.01)
*H04N 19/157* (2014.01)
*H04N 19/12* (2014.01)
*H04N 19/61* (2014.01)
*H04N 19/17* (2014.01)
*H04N 13/00* (2006.01)

(52) U.S. Cl.
CPC ..... *H04N 13/0282* (2013.01); *H04N 19/00769* (2013.01); *H04N 2013/0081* (2013.01); *H04N 19/00212* (2013.01); *H04N 2013/0088* (2013.01); *H04N 19/00078* (2013.01); *H04N 19/00781* (2013.01); *H04N 19/0026* (2013.01)
USPC .............. 375/240.26; 348/48; 348/207.01; 345/629; 382/154

(58) Field of Classification Search
CPC .................. H04N 13/0282; H04N 2013/0081; H04N 2013/0088
USPC ............. 375/240.26; 348/48, 207.1; 345/629; 382/154
See application file for complete search history.

(56) References Cited

U.S. PATENT DOCUMENTS

| 5,652,616 | A | | 7/1997 | Chen et al. |
| 5,727,078 | A | * | 3/1998 | Chupeau ................ 382/154 |
| 6,055,012 | A | * | 4/2000 | Haskell et al. .......... 348/48 |
| 6,111,979 | A | | 8/2000 | Katto |
| 2003/0234866 | A1 | * | 12/2003 | Cutler .................. 348/207.1 |
| 2005/0285875 | A1 | * | 12/2005 | Kang et al. ............ 345/629 |

FOREIGN PATENT DOCUMENTS

| JP | 8077356 A | 3/1996 |
| JP | 9261653 A | 10/1997 |
| JP | 10032840 A | 2/1998 |
| JP | 2004220312 A | 8/2004 |
| KR | 1020020032954 A | 5/2002 |
| KR | 1020030083285 A | 10/2003 |
| KR | 1020040013540 A | 2/2004 |
| KR | 1020040020537 A | 3/2004 |
| KR | 1020040065014 A | 7/2004 |

OTHER PUBLICATIONS

USPTO NFOA mailed Apr. 28, 2011 in connection with U.S. Appl. No. 11/576,964.

USPTO FOA mailed Sep. 26, 2011 in connection with U.S. Appl. No. 11/576,964.
USPTO Corrected NOA mailed Apr. 10, 2012 in connection with U.S. Appl. No. 11/576,964.
International Search Reprot mailed Jan. 10, 2006; PCT/KR2005/003361.

* cited by examiner

*Primary Examiner* — Sath V Perungavoor
*Assistant Examiner* — Xiaolan Xu
(74) *Attorney, Agent, or Firm* — Ladas & Parry LLP

(57) ABSTRACT

Provided is a method and apparatus for encoding and decoding multi-view video data. The encoding method includes: decomposing each view image of the multi-view video into an overlapped region and a non-overlapped region, the overlapped region being overlapped with other view image and the non-overlapped region not being overlapped with other view image; generating a stitched image by combining the non-overlapped region of each view image and a middle view image; encoding the stitched image using a first encoding algorithm; and encoding the overlapped region of each view image, using a second encoding algorithm. Further, the decomposing step includes the steps of estimating disparity information for each view image, based on a predetermined view image; and decomposing each view image into said overlapped region and said non-overlapped region using the estimated disparity information.

11 Claims, 15 Drawing Sheets

Fig. 1
(a) 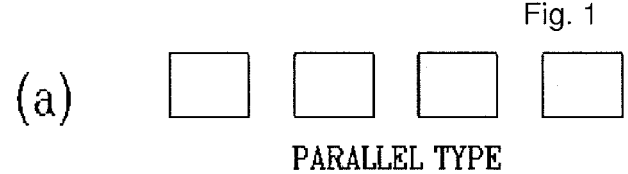
PARALLEL TYPE
(b) 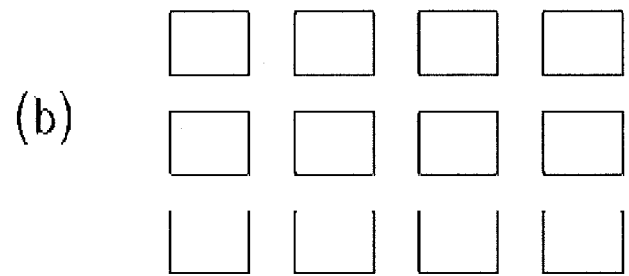
ARRAY TYPE
(c) 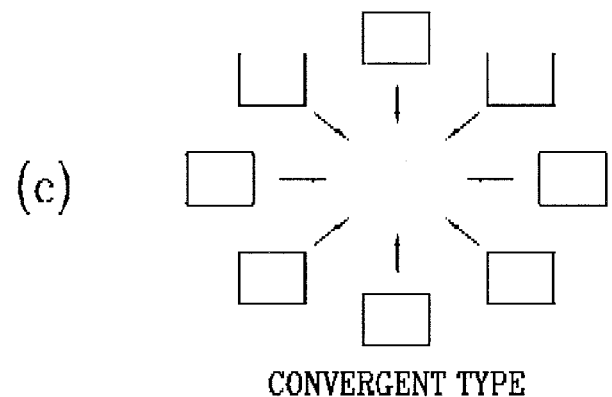
CONVERGENT TYPE
(d) 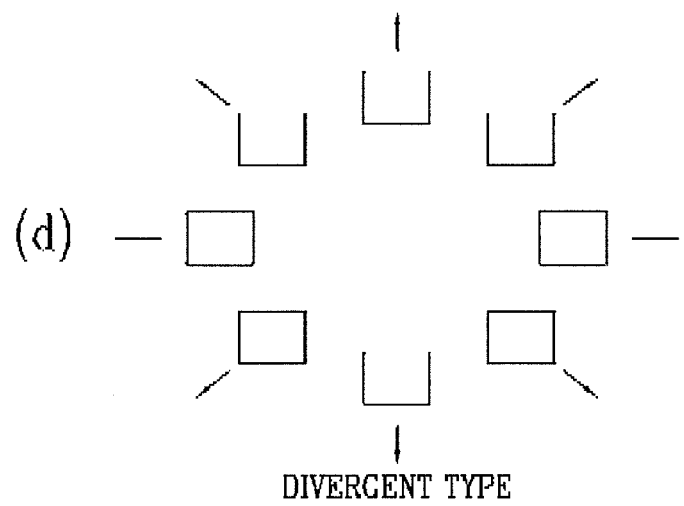
DIVERGENT TYPE Fig. 3
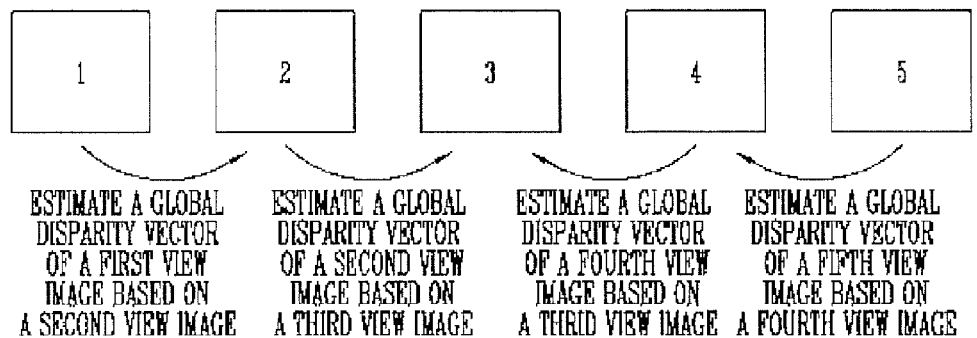
(a)
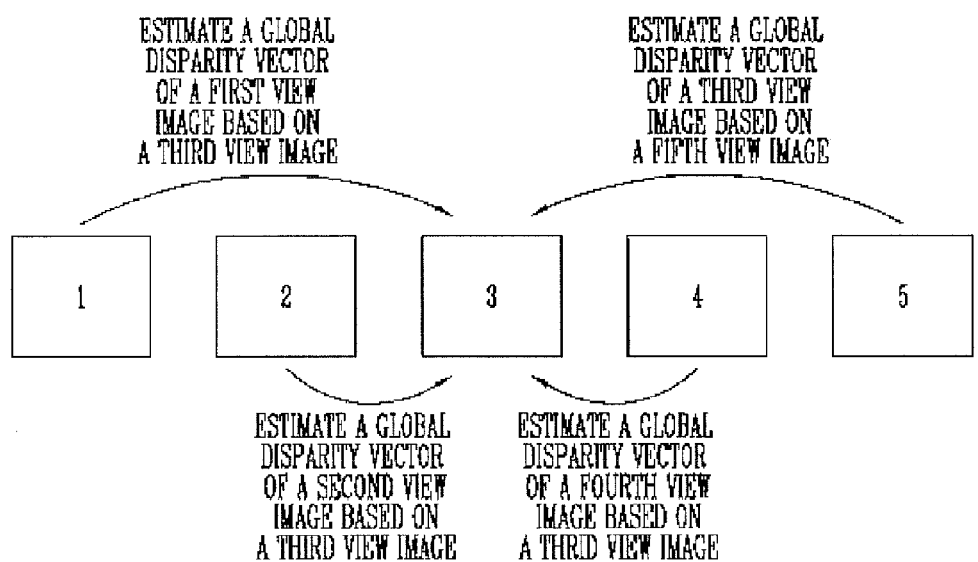
(b)
[Fig. 4]
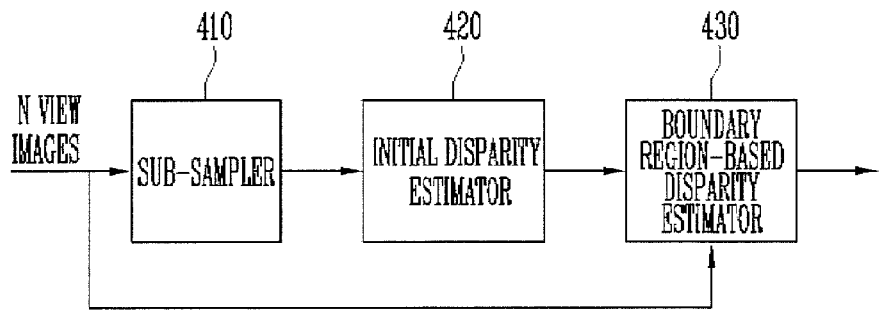

Fig. 5

(a) NUMBER OF HORIZONTAL PIXELS / NUMBER OF VERTICAL PIXELS
SUB-SAMPLING IN 4X4 BLOCK UNIT (b) NUMBER OF HORIZONTAL PIXELS / NUMBER OF VERTICAL PIXELS
SUB-SAMPLING IN 8X8 BLOCK UNIT

Fig. 6
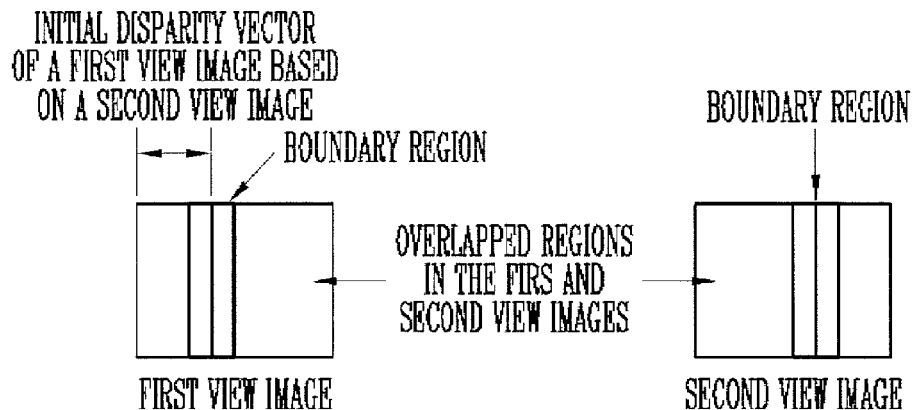
Fig. 7
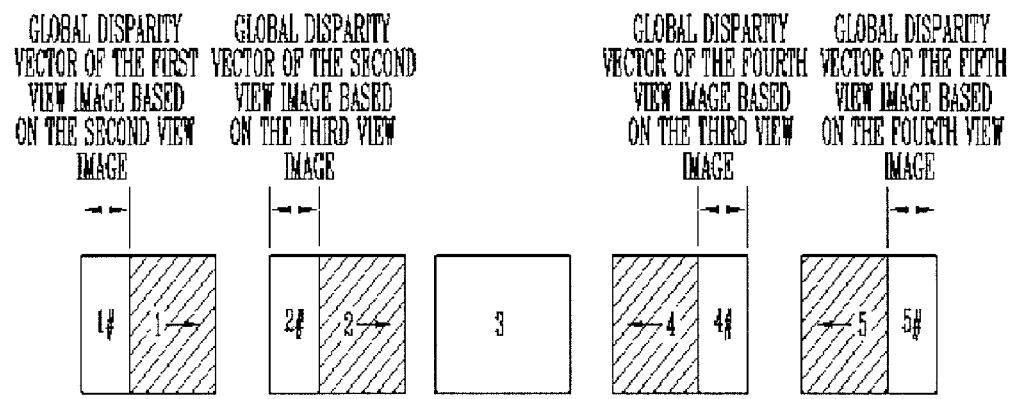
(a)
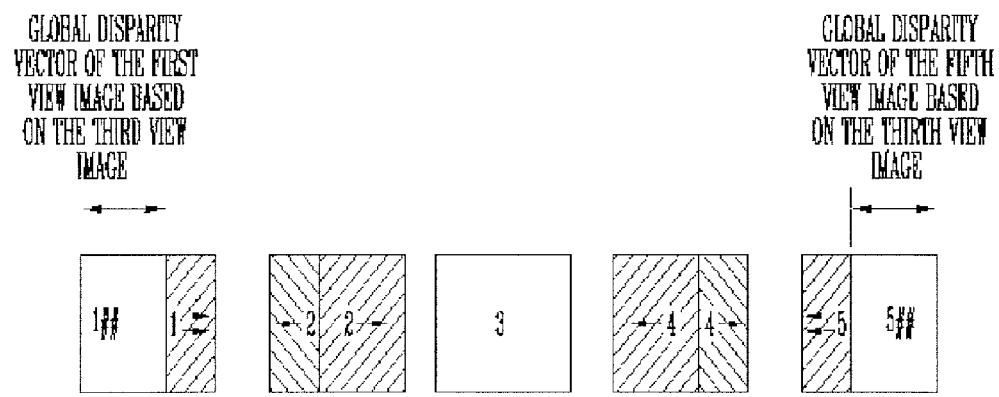
(b)

Fig. 8
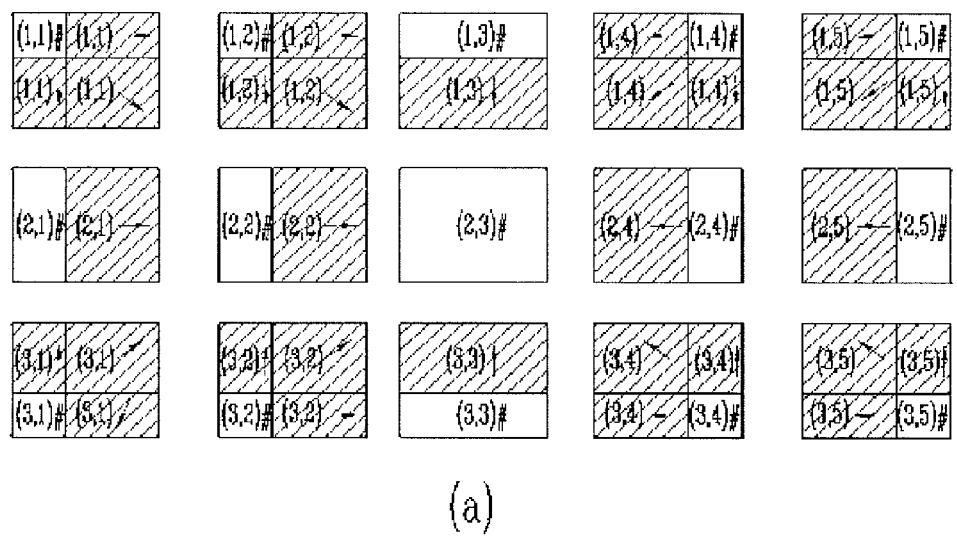
(a)
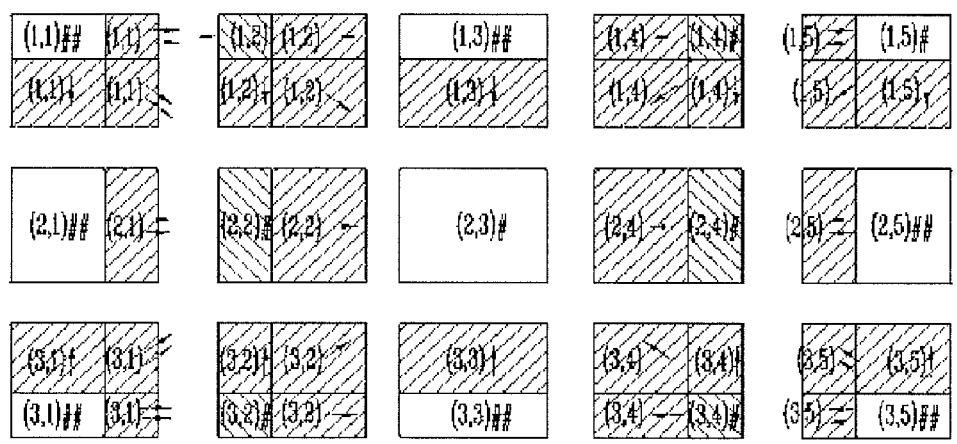
(b)

| 1# | 2# | 3 | 4# | 5# |
|---|---|---|---|---|

(b)

| 1## | 3 | 5## |
|---|---|---|

| (1,1)# | (1,2)# | (1,3) | (1,4)# | (1,5)# |
|---|---|---|---|---|
| (2,1)# | (2,2)# | (2,3) | (2,4)# | (2,5)# |
| (3,1)# | (3,2)# | (3,3) | (3,4)# | (3,5)# |

(b)

| (1,1)## | (1,3)# | (1,5)## |
|---|---|---|
| (2,1)## | (2,3) | (2,5)## |
| (3,1)## | (3,3)# | (3,5)## |

Fig. 11
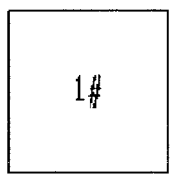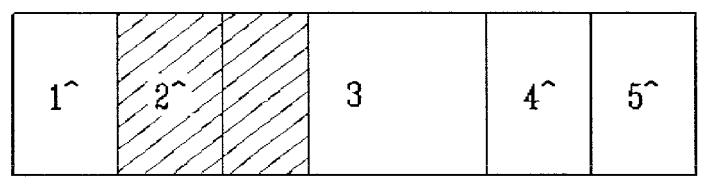
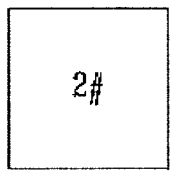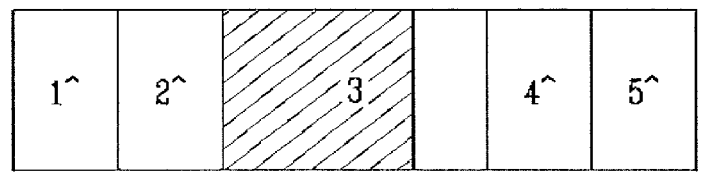
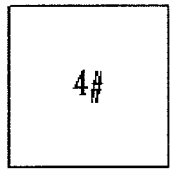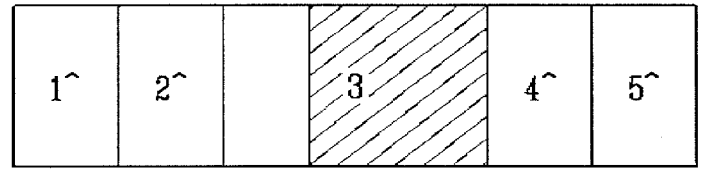
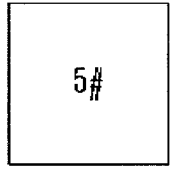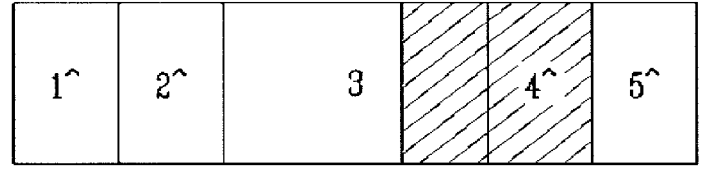

Fig. 17
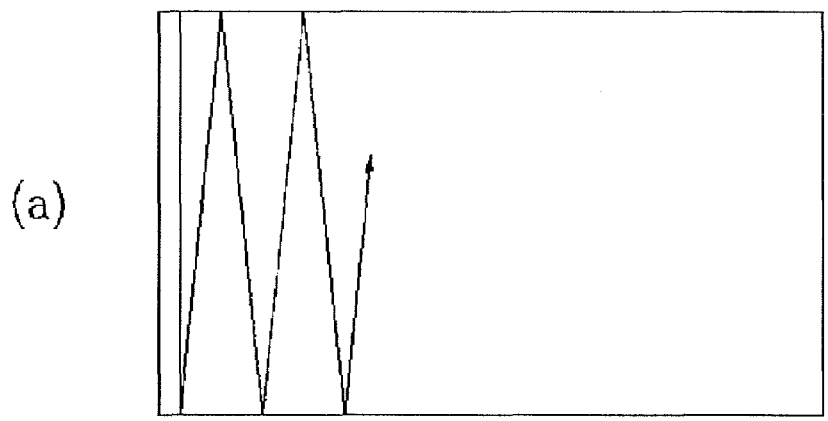
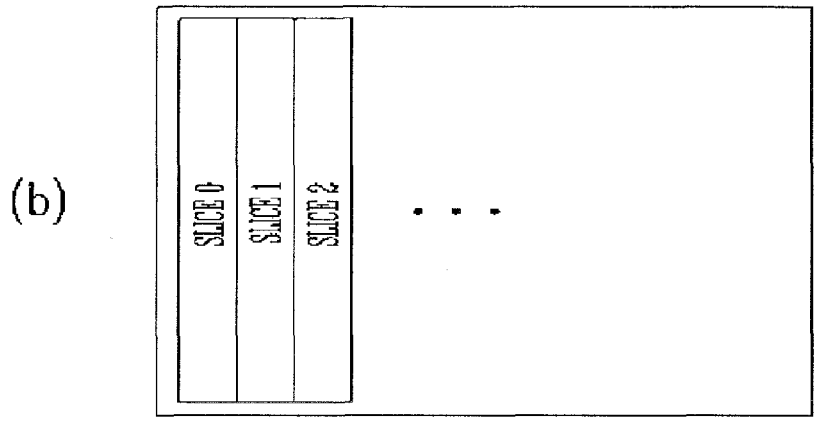
Fig. 18
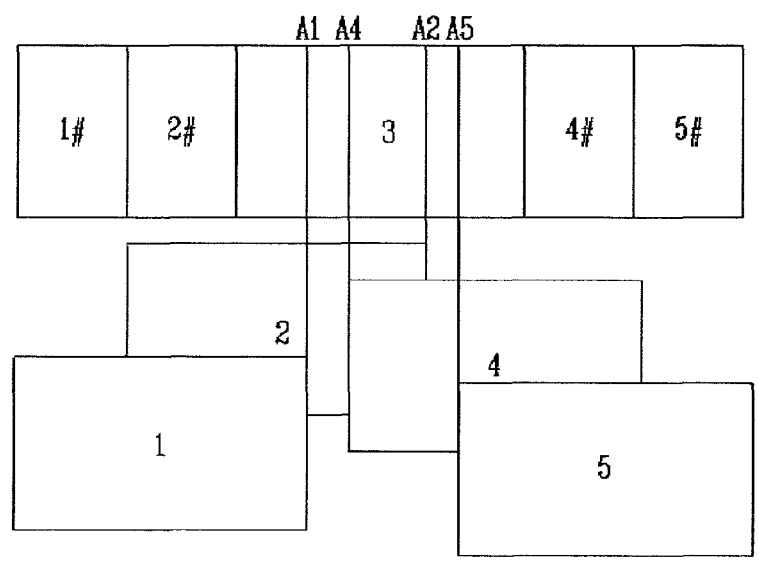

METHOD AND APPARATUS FOR ENCODING AND DECODING MULTI-VIEW VIDEO USING IMAGE STITCHING

BACKGROUND ART

1. Field of the Invention

The present invention relates to a method and apparatus for encoding and decoding multi-view video data and, more specifically, to a method and apparatus for encoding and decoding multi-view video data using correlation information between different views based on a stitched image.

2. Description of Related Art

In general, multi-view video processing technology refers to technology for compressing, uncompressing, synthesizing, and playing multi-view video data that are captured by a plurality of cameras at the same time. The multi-view video processing technology provides more realistic images and cubic effect to the human, so that it begins to be used in various application fields. However, the multi-view video image set having a set of N view images (N>=2) has N times of data compared with the existing video having one view, so that a signal bandwidth should be significantly larger than that of the conventional image processing system.

With respect to this, based on the fact that each view image of the multi-view image set has region overlapped with other view image, which may be referred to "overlapped region" a technology for compressing image data using correlation information on the overlapped regions has been largely developed.

One such multi-view video encoding technology is to encode multi-view video data by expanding MPEG-2 MVP (multi-view profile) and MPEG-4 TS (Temporal Scalability) encoding technology largely used in encoding stereoscopic video data, which is disclosed in Korean Patent Application No. 10-2003-0002116 entitled to "APPARATUS AND METHOD OF COMPRESSING AND UNCOMPRESSING MULTI-VIEW IMAGE" filed on Jan. 13, 2003, and Korean Patent Application No. 10-2003-83285 entitled to "APPARATUS OF ENCODING MULTI-VIEW VIDEO IMAGE" filed on Oct. 30, 2003. In the video encoding technology disclosed in the documents described above, disparity information, or correlation information between different views, and motion information, or correlation information on the time axis are used to perform encoding, thereby improving compression efficiency. However, there is a problem in that it is impossible to restore only a portion of multi-view images. In addition, when only one error occurs in transmitting encoded streams, the error affects video image data for all views.

SUMMARY OF THE INVENTION

An object of the present invention is to provide a method and apparatus for encoding/decoding multi-view video data with improved compression rate, by decomposing each view image into an overlapped region (i.e., a region having correlation information with other view images) and a non-overlapped region (i.e., a region not having correlation information with other view images); and encoding/decoding the overlapped region using motion and disparity information and encoding/decoding the non-overlapped region using only motion information, resulting in a better compression ratio.

In addition, other object of the present invention is to provide a decoding method and apparatus that is capable of selectively restoring only desired view image by using only the corresponding streams among the whole encoded streams, thereby improving decoding efficiency.

In addition, another object of the present invention is to provide encoding method and apparatus that can minimize the effect of a transmission error, even when the error occurs in transmitting the encoded streams.

One aspect of the present invention is to provide a method of encoding multi-view video data, comprising the steps of decomposing each view image of the multi-view video into an overlapped region and a non-overlapped region, said overlapped region being overlapped with other view image and said non-overlapped region not being overlapped with other view image; generating a stitched image by combining said non-overlapped region of each view image and a middle view image; encoding said stitched image using a first encoding algorithm; and encoding the overlapped region of each view image using a second encoding algorithm. Further, the decomposing step includes the steps of estimating disparity information for each view image, based on a predetermined view image; and decomposing each view image into said overlapped region and said non-overlapped region using the estimated disparity information.

The stitched image may be generated by stitching the non-overlapped regions of each view image to boundary of the middle view image.

The first encoding algorithm is motion-compensated encoding algorithm and the second encoding algorithm is motion- and disparity-compensated encoding algorithm.

In one embodiment, the step of estimating the disparity information includes estimating a global disparity vector based on an adjacent view image toward the middle view direction. In other embodiment, the step of estimating the disparity information includes estimating a global disparity vector based on the middle view image.

The step of estimating the global disparity vector comprises the steps of reducing the size of each view image by sub-sampling one pixel from each block unit of each view image, said block unit having a predetermined size; estimating an initial global disparity value for each of the reduced view images; and estimating the global disparity vector for a boundary region of each view image, said boundary region being defined by multiplying said estimated initial global disparity value by the sub-sampling rate.

Another aspect of the present invention is to provide a method of decoding multi-view video data. The decoding method includes: decoding encoded streams of a middle view image and non-overlapped region of each view image of the multi-view video, using motion compensated decoding algorithm; decoding encoded streams of overlapped region of each view image using motion- and disparity-compensated decoding algorithm, based on a stitched image generated by stitching the non-overlapped region of each view image to boundary of the middle view image; and restoring the multi-view video by combining the decoded non-overlapped and overlapped regions of each view image.

In other embodiment, the method may further include a step of restoring a specific view image of the multi-view video in response to a user' selection. The step of restoring the specific view image includes: decoding encoded streams for the non-overlapped region of the specific view image; and decoding the encoded streams for the slice(s) of the middle view image overlapped with the specific view image, by using the slice address that is included in the header of the encoded streams of the middle view image.

Still another aspect of the present invention is to provide an apparatus for encoding multi-view video data. The apparatus includes: region decomposing means for decomposing each view image of the multi-view video into an overlapped region and a non-overlapped region, said overlapped region being overlapped with other view image and said non-overlapped region not being overlapped with other view image; image stitching means for generating a stitched image by combining said non-overlapped region of each view image and a middle view image; a first encoding means for encoding said stitched image using a first encoding algorithm; and a second encoding means for encoding the overlapped region of each view image using a second encoding algorithm.

Yet another aspect of the present invention is to provide an apparatus for decoding multi-view video data. The apparatus includes: means for receiving encoded streams of each view image of the multi-view video, said each view image being decomposed into an overlapped region overlapped with other view image and a non-overlapped region not overlapped with other view image; and the overlapped region and the non-overlapped region being separately encoded; a first decoding means for decoding the encoded streams of a middle view image and the non-overlapped region of each view image of the multi-view video, using motion compensated decoding algorithm; a second decoding means for decoding the encoded streams of the overlapped region of each view image using motion- and disparity-compensated decoding algorithm, based on a stitched image generated by stitching the non-overlapped region of each view image to boundary of the middle view image; and restoring means for restoring the multi-view video by combining the decoded non-overlapped and overlapped regions of each view image.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIGS. 1(a) to (d) are diagrams showing a multi-view camera arrangement for acquiring multi-view images;

FIGS. 3(a) and (b) are two schemes to estimate a global disparity vector according to an embodiment of the present invention, respectively;

FIG. 4 is a detailed block diagram of a global disparity estimator according to an embodiment of the present invention;

FIGS. 5(a) and (b) are diagrams showing examples of a sub-sampling in 4×4 and 8×8 block units, respectively;

FIG. 6 is a diagram showing examples of boundary regions based on the initial global disparity vectors in the first and second view images;

FIGS. 7(a) and 7(b) show multi-view images obtained by multi-view cameras arranged in parallel, where each of the multi-view images is decomposed into an overlapped region and a non-overlapped region according to different schemes of the present invention;

FIGS. 8(a) and 8(b) show multi-view images obtained by multi-view cameras arranged in an array, where each of the multi-view images is decomposed into an overlapped region and a non-overlapped region according to different schemes of the present invention;

FIGS. 9(a) and 9(b) show two different examples of a stitched image from the multi-view images obtained by the multi-view cameras arranged in parallel;

FIGS. 10(a) and 10(b) show two different examples of a stitched image from the multi-view images obtained by the multi-view cameras arranged in array;

FIGS. 11 and 12 show the overlapped regions of each view located in the stitched image (reference image) as shown in FIGS. 9 and 10, respectively;

FIG. 17(a) shows a scanning sequence of macro blocks upon encoding a middle view image; and FIG. 17(b) shows a slice arrangement of the middle view image;

FIG. 18 is a diagram showing slice addresses for overlapped regions of the respective view images, which are to be included in the header of the encoded middle view image stream according to the present invention

DETAILED DESCRIPTION OF THE PREFERRED EMBODIMENTS

The foregoing features and advantages of the present invention will be apparent from the following detailed description with reference to the attached drawings.

Referring now to FIGS. 1(a) to (d), a multi-view camera arrangement for acquiring multi-view video image set is shown. In general, the arrangement shown in FIG. 1(a) is referred to as a parallel-type, FIG. 1(b) as an array-type, FIG. 1(c) as a convergent-type, and FIG. 1(d) as a divergent-type. Besides, a plurality of cameras can be arranged in other manners and it will be appreciated that the present invention is not limited to the specific arrangement types.

Correlation information that exists between different view images obtained from multiple cameras in arranged in various manners as described above can be represented as disparity information. The term "disparity" refers to a distance between the same pixels in two different view images, represented in a pixel unit. Therefore, based on the type of the camera arrangement, a disparity value for the horizontal axis or the vertical axis may be '0'.

For example, in case of the parallel-type arrangement, since a disparity value with respect to the vertical axis is '0', the disparity values need to be estimated with respect to only the horizontal axis. In contrast, in case of the array-type arrangement, disparity values should be estimated for both the horizontal and the vertical axes. Similarly, in case of the divergent-type or convergent-type arrangement, disparity values for the both the horizontal axis and the vertical axis should be estimated.

In the present invention, an image located in the middle of the multi-view images (hereinafter, referred to as "middle view image") is referenced to estimate the disparity for each of the multi-view images. A disparity estimation scheme will be described below.

Figure 2:
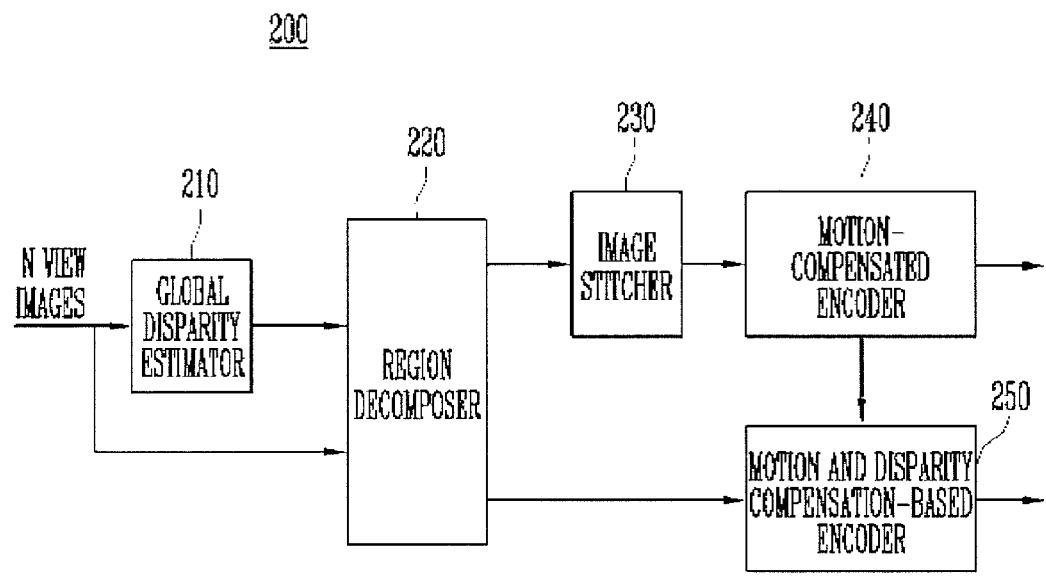
FIG. 2 shows a block diagram of a video image encoding apparatus according to an embodiment of the present invention.

Referring now to FIG. 2, FIG. 2 a block diagram of a video image encoding apparatus according to one embodiment of the present invention is shown. The video encoding apparatus 200 includes a global disparity estimator 210, a region decomposer 220, an image stitcher 230, a motion-compensated encoder 240, and a motion- and disparity-compensated encoder 250.

The global disparity estimator 210 estimates a global disparity vector between two adjacent view images towards the left and the right on the middle view, for each of multi-view image set. The global disparity estimator 201 receives the multi-view image set including N view images (where, N>=2), and estimates (N−1) global disparity vectors between two adjacent view images among the multi-view image set. The global disparity estimator 210 estimates the global disparity vectors for the first frames on each GOP (Group of Picture). Therefore, in one GOP, the same global disparity vector is used to perform image decomposition and image stitching.

According to an embodiment of the invention, a global disparity vector for each view image can be estimated based on other view image towards the left and the right on the middle view. For example, as shown in FIG. 3(a), when the middle view image is a third image, a global disparity vector for a second view image may be estimated based on the third view image, and a global disparity vector for a first view image may be estimated based on the second view image. The global disparity vectors for fourth and fifth view images may be similarly estimated based on the third and the fourth view images, respectively.

Alternatively, a global disparity vector for each of the multi-view video image set may be estimated based on the middle view image. As shown in FIG. 3(b), when the middle view image is the third image, the global disparity vectors for the first, second, fourth and fifth images may be estimated based on the third view image.

FIG. 4 shows a detailed block diagram of a global disparity estimator according to an embodiment of the present invention. As shown in FIG. 4, the global disparity estimator comprises a sub-sampler 410, an initial disparity estimator 420, and a boundary region-based disparity estimator 430. With respect to each of the N view images in the multi-view image set, the sub-sampler 410 extracts a pixel from each block unit of the view image to reduce the original image size. By reducing the original image size through sub-sampling, time and complexity for estimating the initial global disparity vector can be reduced. FIGS. 5(a) and 5(b) show examples of sub-sampling process in a 4×4 block unit and an 8×8 block unit, respectively.

With respect to each of the sub-sampled N view images, the initial disparity estimator 420 estimates the corresponding initial global disparity vectors. According to an embodiment of the present invention, the initial global disparity vector $IDV_{global}$ can be obtained as the following equation.

$$IDV_{global} = \underset{DV_i}{\operatorname{argmin}} \hat{E}(DV_i) \quad \text{[Equation 1]}$$

where $$E(DV_i) = \sum_{l=0}^{width_{sub}-l} \sum_{m=0}^{height_{sub}} |I_{cur}(m, l) - I_{ref}(m, l+i)|,$$

$$\hat{E}(DV_j) = \frac{E(DV_i)}{(width_{sub} - i)(height_{sub})},$$

$$i \in \left[0, \frac{width_{sub}}{2}\right]$$

The boundary region-based disparity estimator 430 may estimate a disparity value for a boundary region of each view image of the multi-view video image set. The boundary region may be defined by multiplying the estimated initial global disparity value by sub-sampling rate.

FIG. 6 is a diagram showing examples of boundary regions based on the initial global disparity vectors in the first and second view images. The boundary region can be arbitrarily sized. The global disparity vector can be estimated for the boundary region indicated by a solid line shown in FIG. 6 in the same manner as the equation 1.

Referring back to FIG. 2, the region decomposer 220 decompose the respective view images, which are located towards the left, right, top and bottom of the middle view image, into an overlapped region and a non-overlapped region, by using the global disparity vectors for the respective view images.

As shown in FIGS. 7(a) and 7(b), each view image of the multi-view video image set, which are captured by a parallel-type multi-view camera arrangement can be decomposed into two parts, i.e., an overlapped region and non-overlapped region. FIG. 7(a) shows that each view image is decomposed using the global disparity vector estimated based on the adjacent view image towards the middle view direction, as shown in FIG. 3(a). As illustrated, the first view image is decomposed into the non-overlapped region and overlapped region, which is overlapped with the second view image; the second view image is decomposed into the non-overlapped region and the overlapped region, which is overlapped with the third view image (the middle view image). The fourth and fifth view images may be decomposed into the non-overlapped regions and overlapped regions in a similar manner. In this case, the non-overlapped regions of the second view image and the middle view image are partly overlapped with the overlapped region of the first view image. Similarly, the non-overlapped region of the fourth view image may be partly overlapped with the overlapped regions of the fifth view image.

Further, FIG. 7(b) shows that each view image is decomposed using the global disparity vector estimated based on the middle view image as shown in FIG. 3(b). In this embodiment, since the global disparity vector of the first view image is estimated based on middle view image, the second view image has only the overlapped region without non-overlapped region. Similarly, since the global disparity vector of the fifth view image is estimated based on middle view image, the fourth view image has only the overlapped region without non-overlapped region.

FIGS. 8(a) and 8(b) show multi-view video image set obtained by multi-view cameras arranged in an array, where each view image of the multi-view video image set is decomposed into an overlapped region and a non-overlapped region according to different schemes of the present invention. Specifically, FIG. 8(a) shows that each view image is decomposed using the global disparity vector estimated based on the adjacent view image toward the middle view image; and FIG. 8(b) shows that each view image is decomposed using the global disparity vector estimated based on the middle view image.

The image stitcher 230 generates a stitched image by stitching the non-overlapped regions of the respective view images to the boundaries (i.e., left, right, top and bottom boundaries) of the middle view image. Such a stitched image will be used as a reference image for obtaining disparity information when encoding the overlapped regions of the respective view images.

FIGS. 9(a) and 9(b) show two different examples of a stitched image generated from the multi-view images obtained by the parallel-type multi-view cameras. Specifically, FIGS. 9(a) and 9(b) show examples of a stitched image generated from the multi-view images decomposed according to FIG. 7(a) and FIG. 7(b), respectively.

FIGS. 10(a) and 10(b) show two different examples of a stitched image generated from the multi-view images obtained by the array-type multi-view cameras. Specifically, FIGS. 10(a) and 10(b) show examples of a stitched image generated from the view images decomposed according to FIG. 8(a) and FIG. 8(b), respectively.

Figure 12:
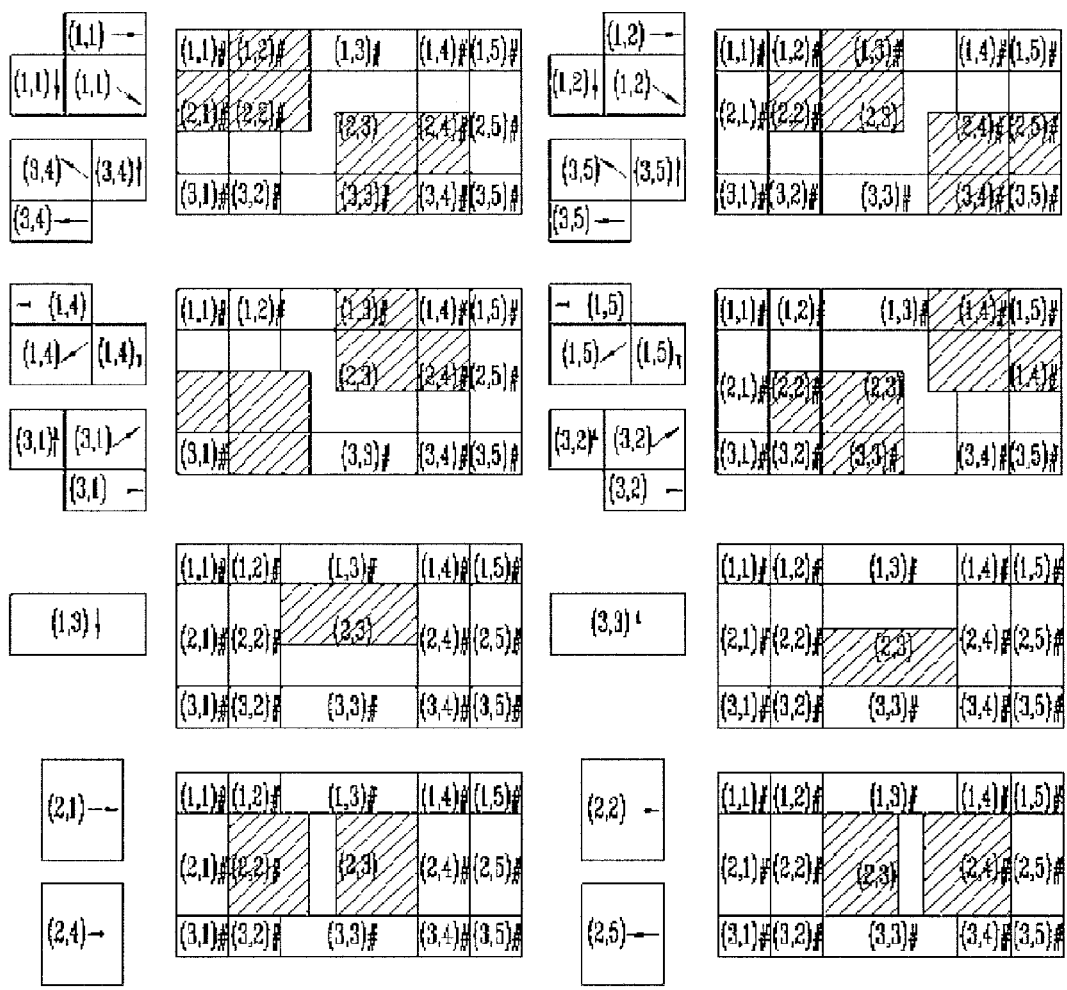
Figure 13:
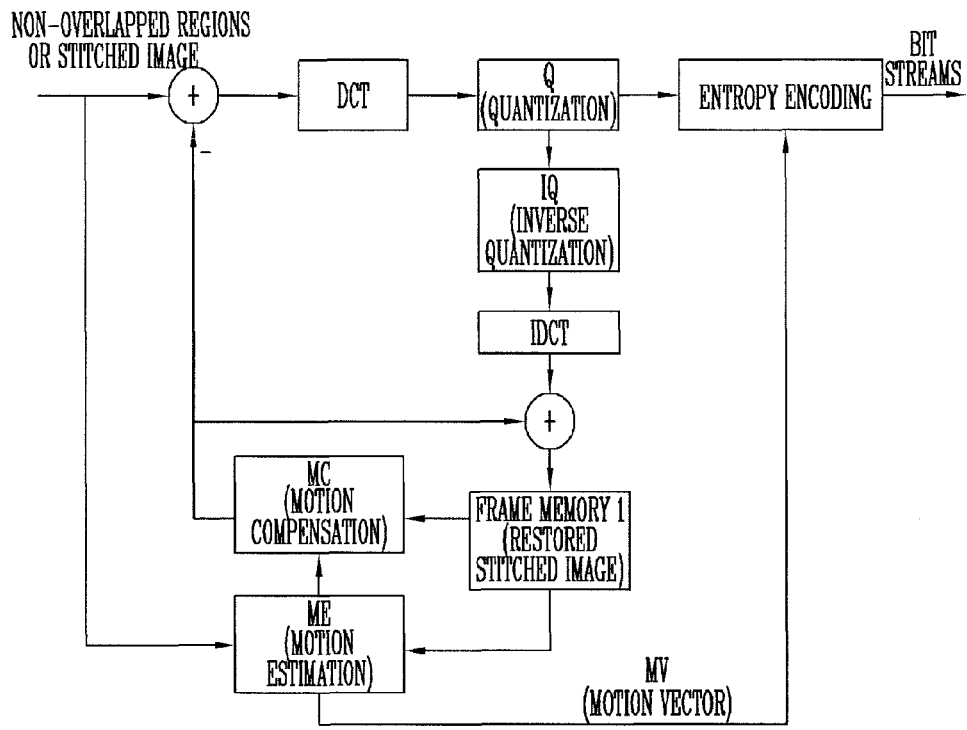
FIG. 13 shows a detailed block diagram of a motion-compensated encoder.

FIGS. 11 and 12 show the overlapped regions of each view image located in the stitched image (reference image) as shown in FIGS. 9 and 10, respectively;

Referring back to FIG. 2, the motion-compensated encoder 240 encodes the stitched image generated by the image stitcher 230. The motion-compensated encoder 240 encodes the stitched image using the motion-compensated algorithm such as MPEG-2 and MPEG-4 encoding algorithms. In other words, as shown in FIG. 13, DCT, quantization, and motion estimation/compensation and entropy coding processes may be performed on the stitched image data, to generate the encoded streams.

Figure 14:
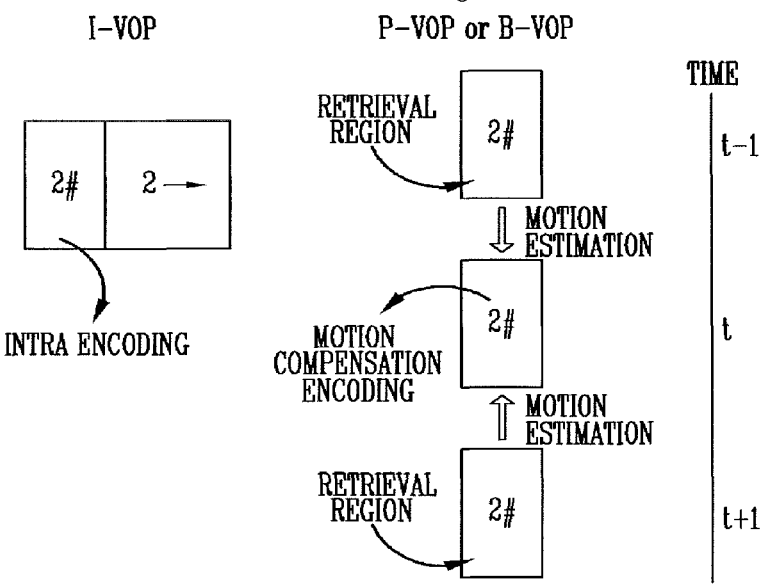
FIG. 14 shows an example of motion-compensated encoding process for I-VOP, P-VOP and B-VOP, with reference to non-overlapped regions.

FIG. 14 shows an example of motion-compensated encoding process for I-VOP, P-VOP and B-VOP, with reference to non-overlapped regions. This is the same arrangement as in the motion estimation and compensation for the conventional MPEG-2, MPEG-4 Part 2 and Part 10 (AVC). In other words, the I-VOP is encoded by Intra-coding; the P-VOP is encoded by motion-estimated and compensated encoding based on the previously existing images on a temporal axis; and the B-VOP is encoded by motion-estimated and compensated encoding based on the previous and next existing images on a temporal axis.

Figure 15:
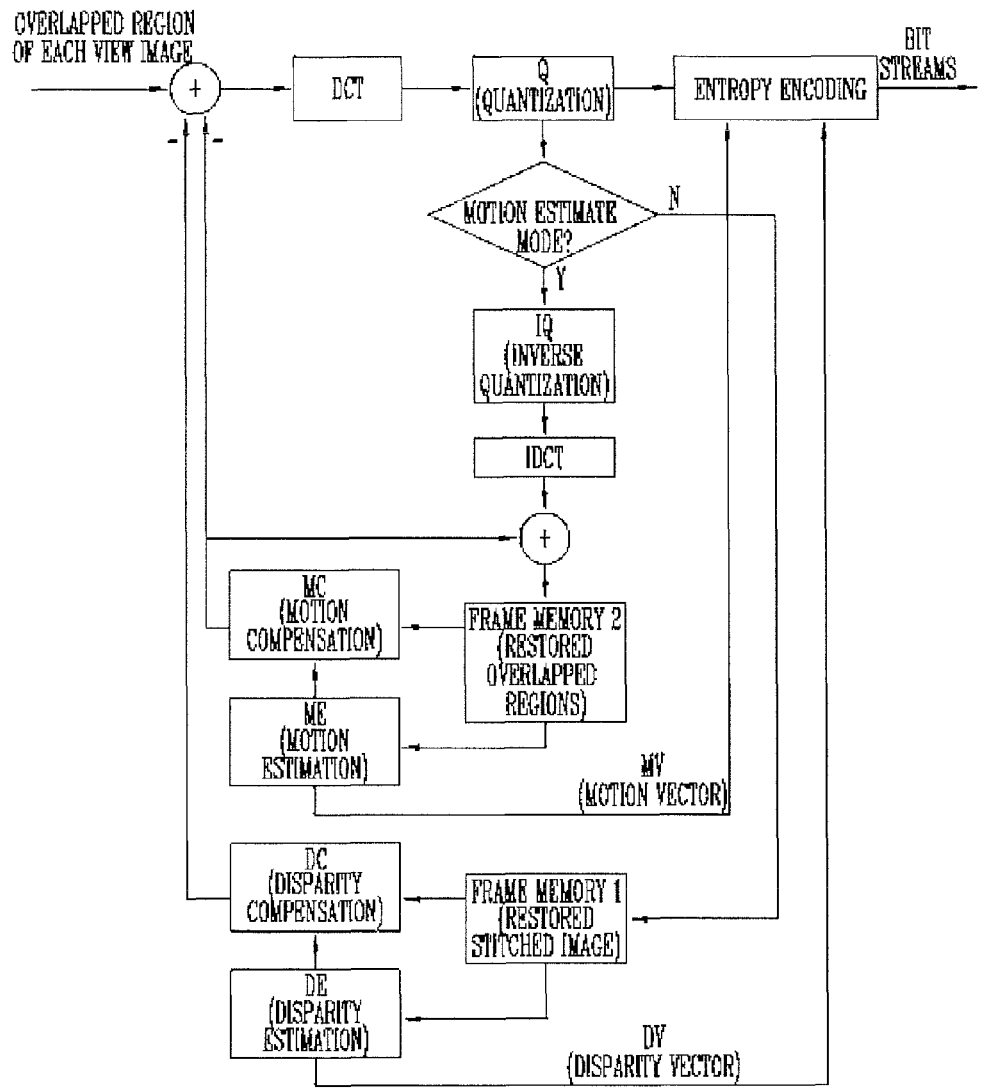
FIG. 15 is a block diagram showing a motion and disparity compensation-based encoder for overlapped regions of each view.

In other hand, the overlapped regions for the respective view images are encoded through the motion and disparity compensated encoder 250. The motion and disparity compensated encoder 250 uses the motion and disparity compensation-based encoding algorithm capable of reducing a temporal and spatial redundancy, such as MPEG-2 multi-view profile (MVP) or MPEG-4 temporal scalability (TS). FIG. 15 is a diagram showing a motion and disparity compensated encoder for encoding the overlapped regions of each view. As shown in FIG. 15, the motion and disparity compensation-based encoding performs DCT, quantization, motion and disparity estimation/compensation and entropy coding processes, to generate the encoded streams.

Figure 16:
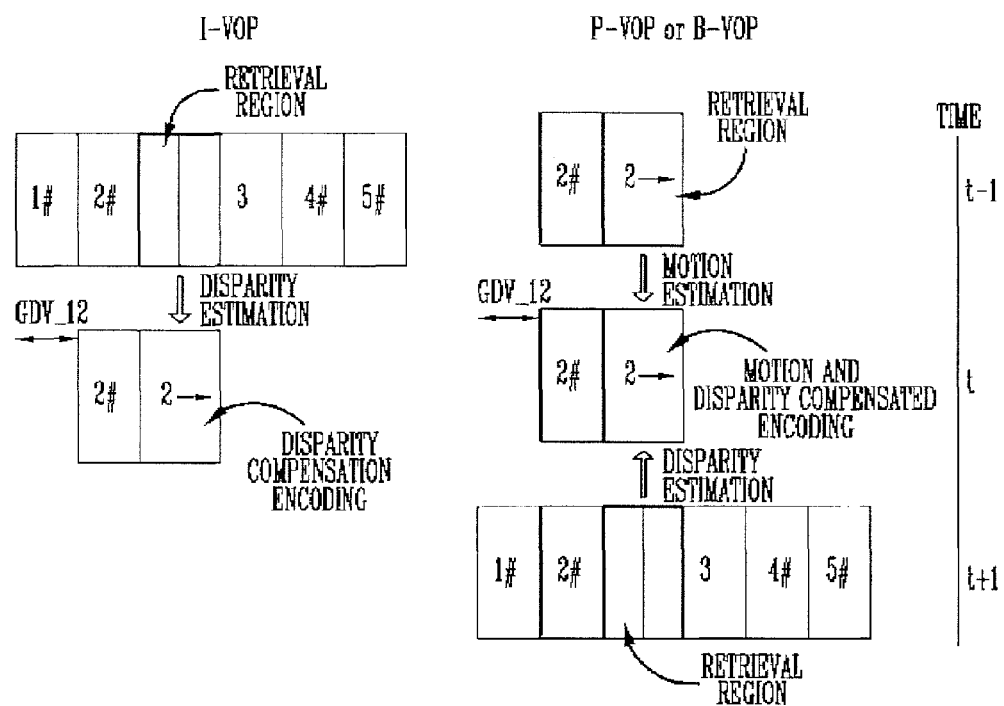
FIG. 16 is a diagram showing an example of motion and disparity compensation-based encoding for I-VOP, P-VOP and B-VOP, with reference to overlapped regions.

FIG. 16 is a diagram showing an example of motion and disparity-compensated encoding for I-VOP, P-VOP and B-VOP, with reference to the overlapped regions. The structure of the motion and disparity-compensated encoding is the same as that for encoding of an enhancement layer in the conventional MPEG-2 MVP and MPEG-4 TS (Temporal Scalability). In other words, the I-VOP is encoded by estimating disparity vectors using the stitched image on the same temporal axis as a reference image, and the P-VOP and B-VOP is encoded by performing the motion estimation and compensation from the previously existing images on the temporal axis and then estimating the disparity vectors using the stitched images on the same temporal axis as a reference image.

Further, depending on multi-view video application models, the user may request the transmission and the restoration for all of the multi-view video image data, or only for a certain portions of them. In case that all of the multi-view images need to be restored, the motion-compensated encoding is performed on the stitched image. However, when only a portion of the multi-view images needs to be restored, the respective views should be encoded so that they could be distinguished from each other. In order to do this, according to an embodiment of the present invention, the motion-compensated encoding is performed for each of the non-overlapped regions for the respective views. Furthermore, the middle view image is partitioned into slices in the vertical direction and encoded on a slice basis, so that only the necessary slice(s) of the middle view image could be decoded when decoding a portion of the multi-view images.

For example, in case of the multi-view video image data obtained from the parallel-type multi-view cameras, the middle view image is scanned in a way that the macro blocks thereof are alternatively scanned in a vertical direction (see FIG. 17(a)), and the slices are defined line by line in the vertical direction (see FIG. 17(b)), to perform motion-compensated encoding. A position where the middle view image overlap with other view images is represented as a slice address and inserted into header information of the encoded stream of the middle view image. Thus, when decoding a portion of the multi-view images, only the necessary slice of the middle view image can be decoded. In other words, when the user intends to restore only a portion of the multi-view images, only a certain region of the middle view image needs to be restored.

FIG. 18 is a diagram showing slice addresses for overlapped regions of the respective view images, which are to be included in the header of the encoded middle view image stream according to the present invention. As shown in FIG. 18, in order to restore the first view image, encoded streams for the non-overlapped regions of the first and second views and the slice(s) from the left end to A1 address of the middle view image are decoded. Similarly, in order to restore the second view image, encoded streams for the non-overlapped region of the second view image and the slice(s) from the left end to A2 address of the middle view image are decoded.

In addition, in order to restore the fourth view image, encoded streams for the non-overlapped region of the fourth view and the slice(s) of A4 address to the right end of the middle view image are decoded. Likewise, in order to restore the fifth view image, encoded streams for the non-overlapped regions for the fourth and fifth view images and the slice(s) from A5 address to the right end of the middle view image are decoded.

Figure 19:
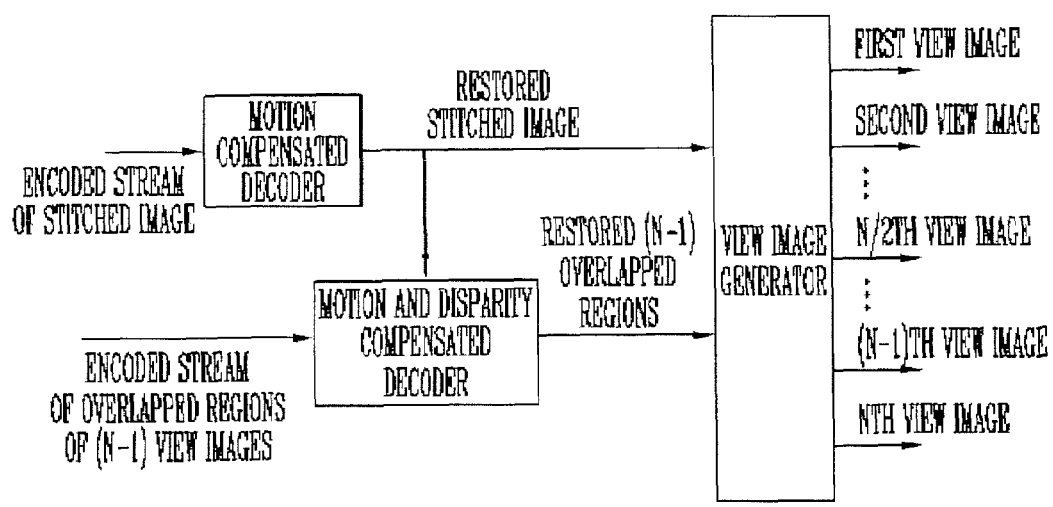
FIG. 19 is a block diagram of a multi-view video image decoding apparatus based on a stitched image according to an embodiment of the present invention.
Figure 20:
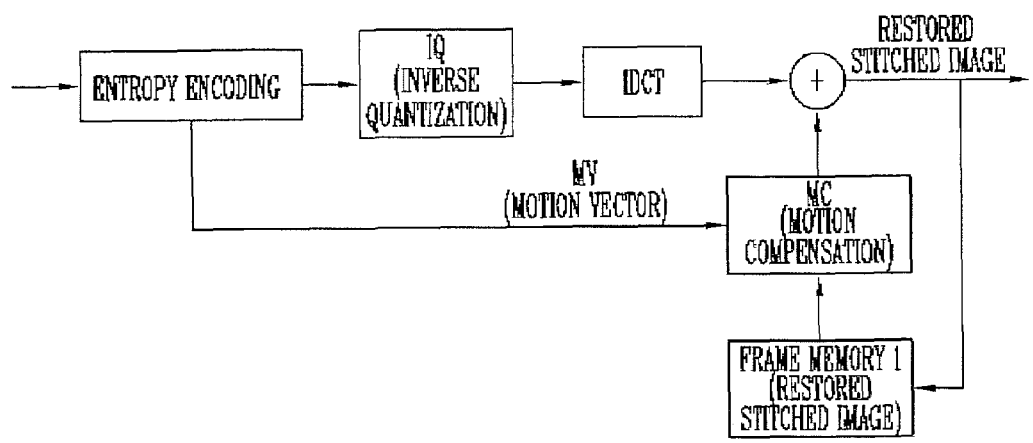
FIG. 20 is a detailed block diagram of a motion-compensated decoder.

FIG. 19 is a block diagram of a multi-view video decoding apparatus using image stitching according to an embodiment of the present invention. As shown in FIG. 19, the decoding apparatus includes a motion-compensated decoder 1910, a motion- and disparity-compensated decoder 1920, and a view image generator 1930. The motion-compensated decoder 1910 decodes the encoded streams of the stitched image (i.e., the non-overlapped regions of the multi-view images) according to the present invention. As shown in FIG. 20, the encoded streams of the stitched image are decoded based on the motion-compensation, as in the decoding of the MPEG-2 and MPEG-4 schemes. In other words, the encoded bit streams are received, and the entropy decoding, inverse quantization, IDCT, and motion compensation are preformed to restore images.

Figure 21:
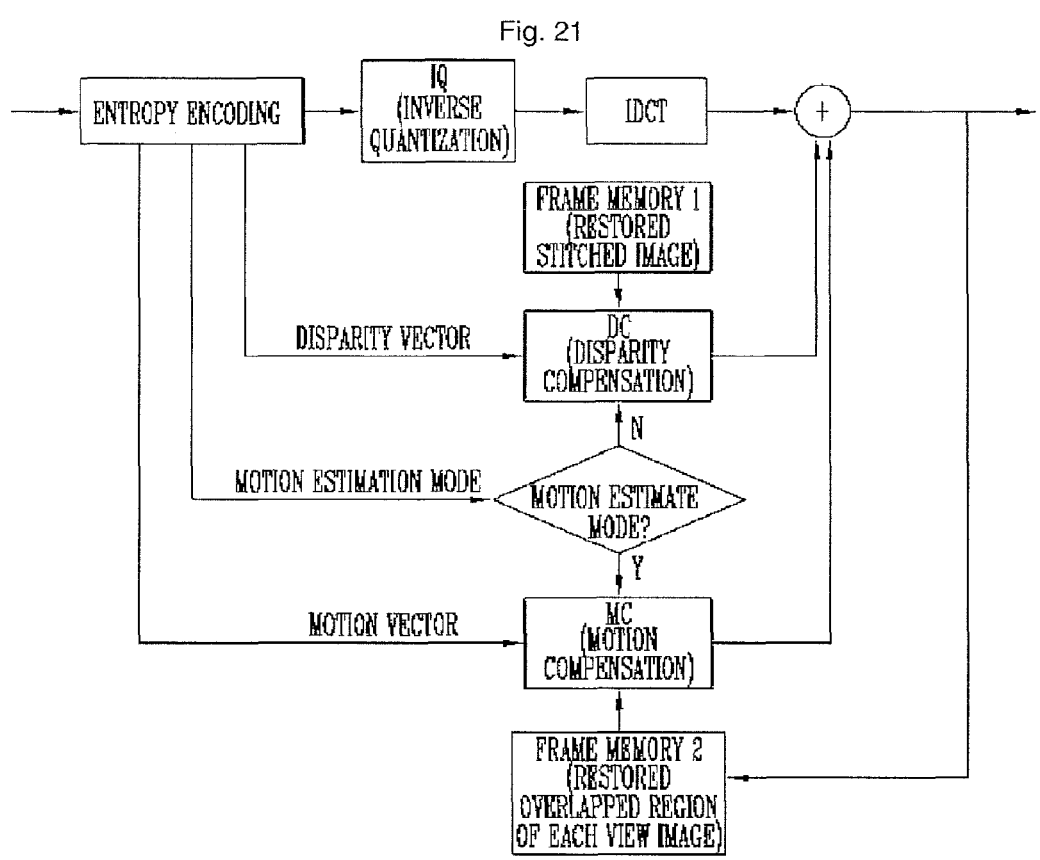
FIG. 21 is a detailed block diagram of a motion and disparity compensation-based decoder.

In contrast, the encoded streams of the overlapped regions for the respective views are decoded through the motion- and disparity-compensated decoder 1920. The detailed construction of the motion- and disparity-compensated decoder 1920 is shown in FIG. 21. As shown in FIG. 21, the motion- and disparity-compensated decoder 1920 has the same structure as in decoding the enhancement layer for MPEG-2 MVP and MPEG-4 TS (Temporal Scalability). In other words, the encoded bit streams are received, and the entropy decoding, inverse quantization, IDCT, and motion and disparity compensation are preformed to restore images.

The structure of the motion- and disparity-compensated decoder 1920 shown herein is well known to those skilled in the art, except that the stitched images restored by the motion and compensation-based decoder 1910 are used as a reference image for obtaining disparity information, and thus the detailed description thereof will be omitted herein.

Referring back to FIG. 19, the view image generator 1930 serves to receive decoded data of the non-overlapped regions and the overlapped regions to restore the respective view images. As described above with reference to FIG. 17, when the user wishes to restore only a portion of the multi-view images, the decoding apparatus according to the present invention can receive and decode only the encoded streams of the non-overlapped regions for the desired view image and encoded streams of the necessary slice(s) of the middle view image, which are overlapped with the desired view image.

According to the present invention, multi-view image data are decomposed into overlapped regions (correlated with other view image) and non-overlapped regions (not correlated with other view image), and separately encoded and decoded, thereby providing a better compression ratio.

In addition, according to the present invention, when the user wishes to restore a desired portion of the multi-view images, only the corresponding portion of the encoded streams need to be received and decoded, so that the transmission and decoding efficiency of the encoded streams are improved.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

The invention claimed is:

1. A computer-implemented method of decoding multi-view video, comprising:
    decoding encoded streams of a stitched image using motion compensated decoding algorithm, said stitched image being generated by stitching non-overlapped region of each view image of the multi-view video to a boundary region of a middle view image of the multi-view video at an encoder; said non-overlapped region of each view image not being overlapped with other view image;
    decoding encoded streams of overlapped region of each view image of the multi-view video using motion- and disparity-compensated decoding algorithm, based on the decoded stitched image, wherein the decoded stitched image is used as a reference image for obtaining disparity information,
    wherein the disparity information is estimated for each of the view image,
    wherein the estimated disparity information comprises estimating a global disparity vector based on an adjacent view image toward the middle view image,
    wherein the estimating the global disparity vector comprises:
    reducing the size of each view image by a sub-sampling one pixel from each block unit of each view image, said block unit having a predetermined size;
    estimating an initial global disparity value for each of the reduced view images; and
    estimating the global disparity vector for the boundary region of each view image, the boundary region being defined by multiplying the estimated initial global disparity value by the sub-sampling rate; and
    restoring the multi-view video by combining the decoded non-overlapped and overlapped regions of each view image, and
    wherein the middle view image is partitioned into a plurality of slices and is encoded on a slice basis, and
    wherein a position where the middle view image overlaps with other view image is represented as a slice address and is comprised in a header of the encoded streams of the middle view image.

2. The computer-implemented method according to claim 1, wherein the decoding of encoded streams of a stitched image using motion compensated decoding algorithm performs entropy decoding, inverse quantization, inverse discrete cosine transform and motion compensation to restore the stitched image.

3. The computer-implemented method according to claim 1, wherein the decoding of encoded streams of the overlapped region of each view image performs entropy decoding, inverse quantization, inverse discrete cosine transform and motion and disparity compensation to restore the overlapped region of each view image.

4. The computer-implemented method according to claim 1, wherein the middle view image is partitioned into a plurality of slices and is encoded on a slice basis.

5. The computer-implemented method according to claim 1, further comprising restoring a specific view image of the multi-view video in response to a user' selection, wherein the restoring of the specific view image comprises:
    decoding encoded streams for the non-overlapped region of the specific view image; and
    decoding the encoded streams for the slice of the middle view image overlapped with the specific view image by referring to the slice address.

6. A computer-implemented method of decoding multi-view video, comprising:
    receiving a user's selection on which view image from a plurality of view images is to be selected for restoration;
    decoding encoded streams for non-overlapped region of the selected view image;
    decoding encoded streams for at least one slice of a middle view image overlapped with the selected view image based on a slice address of the selected view image that is comprised in a header of the encoded streams of the middle view image,
    wherein each of the respective plurality of view images is represented by a different slice address, and
    wherein each of the different slice address represents a position where the middle view image overlaps with the selected view image; and
    restoring the selected view image using the decoded non-overlapped region of the selected view image and the decoded slice of the middle view image overlapped with the selected view image, wherein the middle view image is partitioned into a plurality of slices and is encoded on a slice basis and a position where the middle view image overlaps with other view image is represented as a slice address and is comprised in the header of the encoded streams of the middle view image.

7. The computer-implemented method according to claim 6, wherein said encoded streams for the non-overlapped region of the selected view image are comprised in encoded streams of a stitched image, said stitched image being generated by stitching non-overlapped region of each view image of the multi-view video to boundary of a middle view image of the multi-view video at an encoder.

8. An apparatus for decoding multi-view video data, comprising:
- a first decoder configured to decode encoded streams of a stitched image using motion compensated decoding algorithm, said stitched image being generated by stitching non-overlapped region of each view image of the multi-view video to a boundary region of a middle view image of the multi-view video at an encoder, said non-overlapped region of each view image not being overlapped with other view image;
- a second decoder configured to decode encoded streams of overlapped region of each view image of the multi-view video using motion- and disparity-compensated decoding algorithm, based on the decoded stitched image, wherein the decoded stitched image is used as a reference image for obtaining disparity information,
wherein the boundary region of the middle view image is estimated based on a global disparity vector, and
    wherein the boundary region being defined by multiplying an estimated initial global disparity value by a sub-sampling rate; and
- a view image generator configured to restore the multi-view video by combining the decoded non-overlapped and overlapped regions of each view image,
wherein the middle view image is partitioned into a plurality of slices and is encoded on a slice basis and a position where the middle view image overlaps with other view image is represented as a slice address and is comprised in a header of the encoded streams of the middle view image.

9. The apparatus according to claim 8, wherein the first decoder performs entropy decoding, inverse quantization, inverse discrete cosine transform and motion compensation to restore the stitched image.

10. The apparatus according to claim 8, wherein the second decoder performs entropy decoding, inverse quantization, inverse discrete cosine transform and motion and disparity compensation to restore the overlapped region of each view image.

11. The apparatus according to claim 8, wherein the first decoder is capable of decoding encoded streams for the non-overlapped region of a view image selected by a user and encoded streams for at least one slice of the middle view image overlapped with the selected view image, using the slice address that is comprised in the header of the encoded streams of the middle view image; and the view image generator restores only the selected view image by combining the decoded non-overlapped region of the selected view image and the decoded slice of the middle view image overlapped with the selected view image.

* * * * *